US010878555B2

(12) United States Patent
 Araki

(10) Patent No.: US 10,878,555 B2
(45) Date of Patent: Dec. 29, 2020

(54) IMAGE PROCESSING SYSTEM, IMAGE PROCESSING DEVICE, AND NON-TRANSITORY COMPUTER READABLE RECORDING MEDIUM

(71) Applicant: OMRON Corporation, Kyoto (JP)

(72) Inventor: Tsunehiko Araki, Kusatsu (JP)

(73) Assignee: OMRON Corporation, Kyoto (JP)

( * ) Notice: Subject to any disclaimer, the term of this patent is extended or adjusted under 35 U.S.C. 154(b) by 135 days.

(21) Appl. No.: 15/892,346

(22) Filed: Feb. 8, 2018

(65) Prior Publication Data
 US 2019/0035072 A1 Jan. 31, 2019

(30) Foreign Application Priority Data
 Jul. 25, 2017 (JP) .................................. 2017-143791

(51) Int. Cl.
 *G06T 7/00* (2017.01)
 *G06T 1/00* (2006.01)
(52) U.S. Cl.
 CPC .......... *G06T 7/0006* (2013.01); *G06T 1/0007* (2013.01); *G06T 2207/30164* (2013.01)
(58) Field of Classification Search
 CPC combination set(s) only.
 See application file for complete search history.

(56) References Cited

U.S. PATENT DOCUMENTS

| 5,255,329 | A  | * | 10/1993 | Tanimizu | G06K 9/6202 348/128 |
| 6,925,245 | B1 | * | 8/2005  | Miyatake | G11B 27/28 386/241 |
| 7,675,541 | B2 | * | 3/2010  | Kondo    | H04N 9/12 348/61 |

(Continued)

FOREIGN PATENT DOCUMENTS

| JP | H1173511      |   | 3/1999 |            |
|----|---------------|---|--------|------------|
| JP | WO2007/023565 | * | 3/2007 | A61B 3/14  |
| JP | 2007249270    | * | 9/2007 | G08B 13/196 |

OTHER PUBLICATIONS

"Office Action of German Counterpart Application", dated Jul. 9, 2019, with English translation thereof, p. 1-p. 17.

*Primary Examiner* — Zhiyu Lu
(74) *Attorney, Agent, or Firm* — JCIPRNET

(57) ABSTRACT

An image processing system, an image processing device and a non-transitory computer-readable recording medium are provided. A collection condition setting part sets a collection condition for collecting processing information from the buffer area, an output format of the collected processing information, and an output destination of the collected processing information. The collecting part collects, among pieces of processing information temporarily stored in the buffer area, a piece of processing information that satisfies an image collection condition set by the collection condition setting part, and sends the collected processing information to the output part. The output part (Continued)

outputs the sent processing information according to an image collection rule set by the collection condition setting part. The condition setting part updates an image collection condition and an image collection rule stored in a storage condition DB on the basis of setting information input from an operation display device.

13 Claims, 12 Drawing Sheets

(56) References Cited

U.S. PATENT DOCUMENTS

| | | | | |
|---|---|---|---|---|
| 8,923,600 | B2* | 12/2014 | Zafar | G03F 1/84 |
| | | | | 382/144 |
| 10,657,626 | B2* | 5/2020 | Kiuchi | G06T 9/001 |
| 2003/0058341 | A1* | 3/2003 | Brodsky | G08B 21/043 |
| | | | | 348/169 |
| 2006/0055825 | A1* | 3/2006 | Shiota | H04N 21/4318 |
| | | | | 348/563 |
| 2006/0083443 | A1* | 4/2006 | Tojo | G06K 9/4642 |
| | | | | 382/305 |
| 2008/0137964 | A1* | 6/2008 | Takahashi | G06F 16/56 |
| | | | | 382/209 |
| 2008/0192129 | A1* | 8/2008 | Walker | G11B 27/34 |
| | | | | 348/231.2 |
| 2009/0297019 | A1 | 12/2009 | Zafar et al. | |
| 2012/0113272 | A1* | 5/2012 | Hata | H04N 1/00251 |
| | | | | 348/207.1 |
| 2012/0230589 | A1* | 9/2012 | Baba | G06F 16/7837 |
| | | | | 382/192 |
| 2015/0100355 | A1* | 4/2015 | Tanimoto | G06Q 10/063 |
| | | | | 705/7.11 |
| 2015/0271455 | A1* | 9/2015 | Yuan | H04N 7/188 |
| | | | | 348/231.99 |
| 2016/0012577 | A1* | 1/2016 | Oka | G05B 19/4188 |
| | | | | 382/152 |

* cited by examiner

IMAGE PROCESSING SYSTEM, IMAGE PROCESSING DEVICE, AND NON-TRANSITORY COMPUTER READABLE RECORDING MEDIUM

CROSS-REFERENCE TO RELATED APPLICATION

This application claims the priority of Japan patent application serial no. 2017-143791, filed on Jul. 25, 2017. The entirety of the above-mentioned patent application is hereby incorporated by reference herein and made a part of this specification.

BACKGROUND

Technical Field

The disclosure relates to an image processing system, an image processing device, and a non-transitory computer readable recording medium including an image processing program in which image data used for image measurement and attribute information indicating a result of the image measurement are stored.

Description of Related Art

In various production fields, an image processing device is used for determining the quality of manufactured goods and the like. There is demand to store image data used for image measurement by said image processing device in order for the image data to be used afterwards.

For example, in Japanese Patent Application Laid-Open, First Publication No. H11-73511 (Patent Literature 1), an image processing device "capable of evaluating whether a measurement condition such as a determination threshold value is appropriately set by storing images of both OK and no-good (NG) products" is disclosed (see paragraph [0009] of Patent Literature 1).

[Patent Document 1] Japanese Unexamined Patent Application, First Publication No. H11-73511

Since the amount of data that can be stored is limited when storing the data related to image measurement, a configuration in which only the data to be used is stored without storing data not used after image measurement is necessary. Therefore, it is desirable to increase the flexibility in setting conditions for collecting data to be stored. Besides, to facilitate the use of data after storage, it is desirable to increase the flexibility in setting rules for storing collected data.

SUMMARY

According to an embodiment, an image processing system includes one or a plurality of storage parts, an imaging part configured to capture an image of an object and generate image data, an image measuring part configured to calculate a feature amount included in the image data from the imaging part, evaluate the calculated feature amount according to a image measurement condition which is predetermined, and output a image measurement result related to the object, a storage processing part configured to, when the feature amount calculated from the image data satisfies any one of one or a plurality of image collection conditions set independently from the image measurement condition, store the image data and attribute information indicating the image measurement result corresponding to the image data in any one of the one or the plurality of storage parts according to an image collection rule associated with the satisfied image collection condition, and a setting receiving part configured to receive setting of the image collection condition and the image collection rule. The image collection rule includes a storage format rule for the image data and a storage location rule for the image data.

According to another aspect, an image processing device includes one or a plurality of storage parts, an interface configured to receive image data of an object captured by an imaging device, an image measuring part configured to calculate a feature amount included in the image data from the imaging device, evaluate the calculated feature amount according to a predetermined image measurement condition, and output an image measurement result on the object, a storage processing part configured to, when the feature amount calculated from the image data satisfies any one of one or a plurality of image collection conditions set independently from the image measurement condition, store the image data and attribute information indicating the image measurement result corresponding to the image data in any one of the one or the plurality of storage parts according to an image collection rule associated with the satisfied image collection condition, and a setting receiving part configured to receive setting of the image collection condition and the image collection rule. The image collection rule includes a storage format rule for image data and a storage location rule for image data.

According to still another aspect, an image processing program includes receiving image data of an object captured by an imaging device, calculating a feature amount included in the image data from the imaging device, evaluating the calculated feature amount according to a predetermined image measurement condition and outputting an image measurement result on the object, when the feature amount calculated from the image data satisfies any one of one or a plurality of image collection conditions set independently from the image measurement condition, storing the image data and attribute information indicating the image measurement result corresponding to the image data in any one of the one or the plurality of storage parts according to an image collection rule associated with the satisfied image collection condition, and receiving setting of the image collection condition. The image collection rule includes a storage format rule for image data and a storage location rule for image data.

The above aspects of the present disclosure will become apparent from the following detailed description related to the disclosure understood with reference to the accompanying drawings.

DESCRIPTION OF THE EMBODIMENTS

Figure 1:
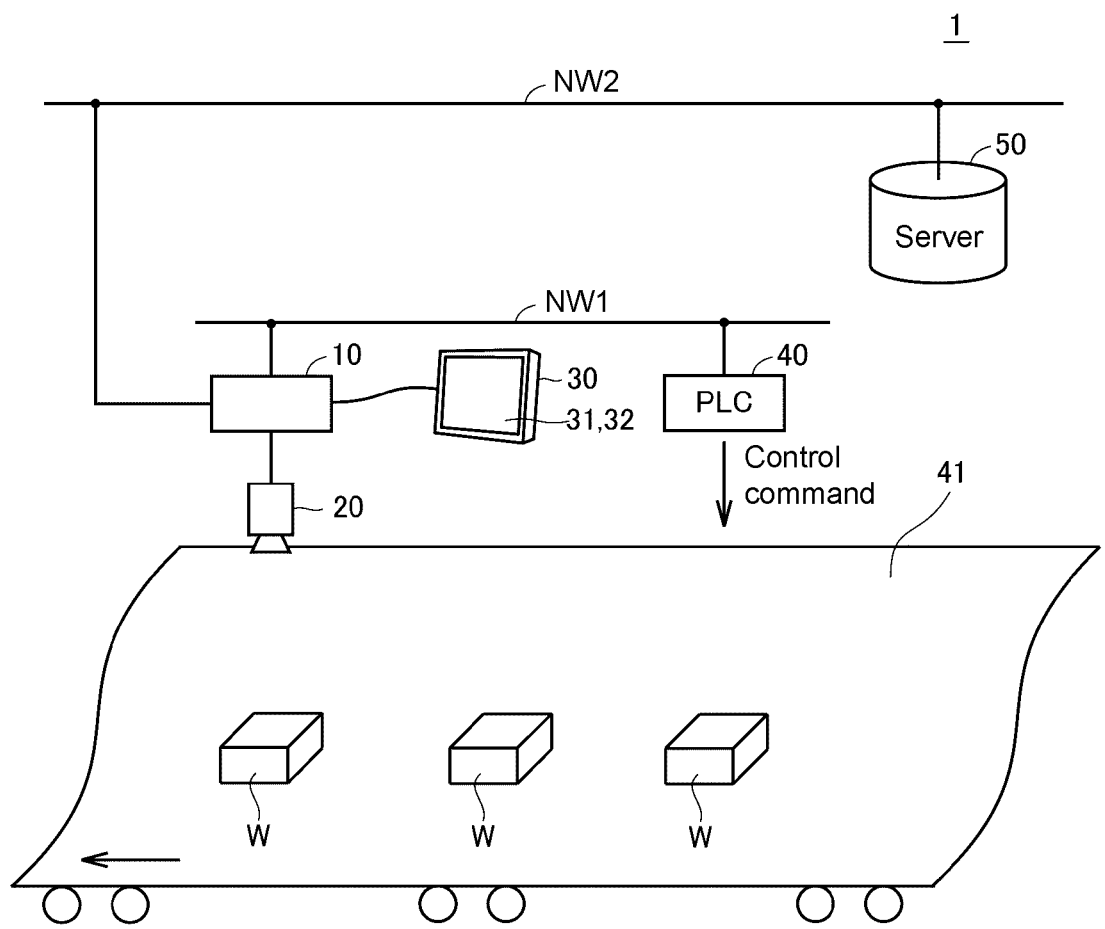
FIG. 1 is a schematic diagram illustrating a basic configuration of an image processing system according to an embodiment of the disclosure.

Hereinafter, each embodiment according to the invention will be described with reference to the drawings. In the following description, like parts and elements are denoted by like reference numerals. Same applies to names and functions of the like parts and elements. Accordingly, detailed descriptions thereof will not be repeated. It is to be noted that the embodiments and modifications described below may be appropriately selectively combined.

It is an aspect of the disclosure to provide an image processing system in which, as described above, the flexibility in setting conditions for collecting data and rules for storing collected data is high.

According to an image processing system according to an embodiment, the flexibility in setting conditions for collecting data or rules for storing collected data is high.

According to an embodiment of the disclosure, the image collection conditions may include a first collection condition set in relation to the feature amount, and a second collection condition set independently from the feature amount to collect a portion of image data that satisfies the first collection condition.

According to an embodiment of the disclosure, the storage format rule may include a rule as to whether the image data is stored in a compressed format.

According to an embodiment of the disclosure, the rule as to whether the image data is stored in the compressed format may include a rule as to whether image data is stored in a format that allows the image data to be restored to a state before compression when the image data is compressed.

According to an embodiment of the disclosure, the attribute information may include one or a plurality of pieces of information. When the image data and the attribute information are stored, the storage processing part may set at least one of the pieces of information of the attribute information as a storage name.

According to an embodiment of the disclosure, the image collection rule may include a rule of a storage name. The setting receiving part may receive setting of the rule of the storage name.

According to an embodiment of the disclosure, the image processing system may further include an analyzing part configured to collect the image data that satisfies the image collection condition received by the setting receiving part and analyze a result of the collection on the basis of the collected image data and attribute information corresponding to the image data.

According to an embodiment of the disclosure, the image processing system may further include a display part configured to display the attribute information corresponding to the image data collected by the analyzing part.

According to an embodiment of the disclosure, the one or the plurality of storage parts may store the image collection conditions and the image collection rules. The analyzing part may search for, among the image collection conditions received by the setting receiving part, an image collection condition overlapping with the image collection condition stored in the one or the plurality of storage parts except the image collection conditions received by the setting receiving part. The display part may display a result searched by the analyzing part.

[A. Configuration of Image Processing System]

FIG. 1 is a schematic diagram illustrating a basic configuration of an image processing system 1 according to an embodiment of the invention. The image processing system 1 includes an image processing device 10 and a camera 20 as main elements. The camera 20 captures an image of an object W conveyed by a conveying device 41 such as a belt conveyor and generates image data. To measure the state of the object W, the image processing device 10 performs image measurement processing on the image data generated by the camera 20, thereby performing image measurement.

The camera 20 is an imaging part that captures an image of a subject present in an imaging visual field and generates image data. The camera 20 includes an optical system such as a lens and a diaphragm and a light receiving element such as a Charge Coupled Device (CCD) image sensor and a Complementary Metal Oxide Semiconductor (CMOS) image sensor as main elements.

The image processing device 10 extracts a feature amount from the image data generated by the camera 20 and measures a state of the object W on the basis of the feature amount. For example, the image processing device 10 performs quality determination of the object W, measurement of physical property values of the object W, quality checking of the object W, and the like. Further, the image processing device 10 stores processing information obtained by the image measurement including the image data generated by the camera 20 in a storage part according to a storage condition.

The storage part includes a server 50 connected to the image processing device 10 via a network (hereinafter also referred to as "NW") 2, an internal memory included in the image processing device 10, and an external memory that is directly connectable to the image processing device 10.

The image processing device 10 is connected to a programmable logic controller (hereinafter also referred to as "PLC") 40 via a NW 1. The PLC 40 controls the conveying device on the basis of a result of the image measurement performed by the image processing device 10. Preferably, a bus or a network that performs fixed-period communication in which a data arrival time is guaranteed is employed as the NW 1. EtherCAT (registered trademark), EtherNet/IP (registered trademark), DeviceNet (registered trademark), CompoNet (registered trademark), and the like are known as a bus or a network for performing such fixed-period communication.

The server 50 is connected to the image processing device 10 via the NW 2. The NW 2 is typically a Local Area Network (LAN), and is provided separately from the NW 1 serving as a communication path with the PLC 40. Although NW 1 and NW 2 are separately provided, the NW 1 and the NW 2 may be the same network. Further, the PLC 40 and the server 50 may be communicably connected.

The image processing device 10 can be connected to an operation display device 30. The operation display device 30 is a device for setting various processes to be performed by the image processing device 10. The operation display device 30 includes a display part 31 and a touch panel 32 mounted on a display surface of the display part 31. The display part 31 includes typically a liquid crystal display, and displays various types of information obtained from the image processing device 10 to a user. The touch panel 32 functions as an input part for inputting information on various settings. For example, by operating the touch panel 32 on the basis of the information displayed on the display part 31, the user may input setting information to set a storage condition for storing processing information. The operation display device 30 may be a part of the image processing device 10. Although the input part has been described above as being formed of the touch panel, the input part may also be formed of a keyboard, a mouse, or both thereof.

[B. Hardware Configuration of Image Processing Device 10]

Figure 2:
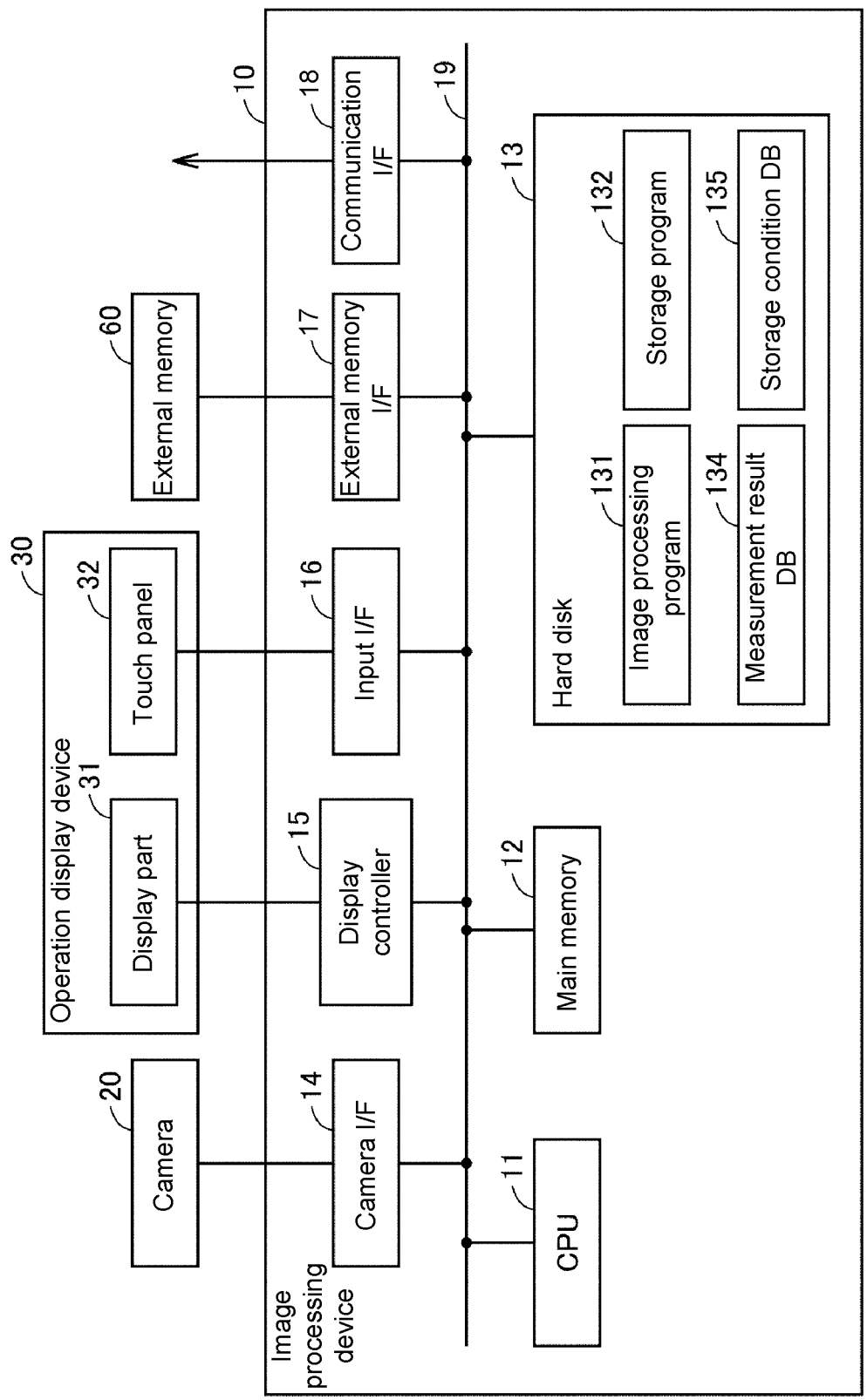
FIG. 2 is a schematic diagram illustrating a hardware configuration of the image processing system.

FIG. 2 is a schematic diagram illustrating a hardware configuration of the image processing device 10. The image processing device 10 includes a Central Processing Unit (CPU) 11, a main memory 12, a hard disk 13, a camera interface (I/F) 14, a display controller 15, an input I/F 16, an external memory I/F 17, and a communication I/F 18. These parts are connected to each other via a bus 19 so that data communication is possible therebetween.

The CPU 11 develops programs (codes) including an image measurement program 131 and a storage program 132 installed in the hard disk 13 in the main memory 12 and executes the programs in a predetermined order, thereby performing various arithmetic operations.

The main memory 12 is typically a volatile memory such as a Dynamic Random Access Memory (DRAM).

The hard disk 13 is an internal memory included in the image processing device 10, and is a nonvolatile memory. In addition to the image measurement program 131 and the storage program 132, the hard disk 13 includes a measurement result database (hereinafter also referred to as "DB") 134 for storing processing information and a storage condition DB 135 for storing storage conditions. In addition to or instead of the hard disk 13, a semiconductor memory such as a flash memory may be employed.

The camera I/F 14 mediates data transmission between the CPU 11 and the camera 20. That is, the camera I/F 14 is connected to the camera 20 that generates image data. The camera I/F 14 also assigns a command for controlling an imaging operation in the connected camera 20 according to an internal command from the CPU 11.

The display controller 15 is connected to the display part 31 of the operation display device 30 and notifies the user of a processing result and the like in the CPU 11. That is, the display controller 15 is connected to the display part 31 and controls display on the display part 31.

The input I/F 16 is connected to the touch panel 32 of the operation display device 30 and mediates data transmission between the CPU 11 and the touch panel 32. That is, the input I/F 16 receives an operation command assigned by the user operating the touch panel 32. The operation command includes, for example, an operation command for setting a storage condition or a measurement condition.

The external memory I/F 17 is connected to an external memory 60 and performs a process of reading/writing data from/to the external memory 60. The external memory 60 can be attached and detached to and from the image processing device 10 and is typically a nonvolatile memory such as a Universal Serial Bus (USB) memory and a memory card.

The communication I/F 18 exchanges various data between the PLC 40, the server 50, and the CPU 11. The communication I/F 18 includes hardware corresponding to the NW 1 for exchanging various data with the PLC 40 and hardware corresponding to the NW 2 for exchanging various data with the server 50.

[C. Functional Configuration of Image Processing Device]

Figure 3:
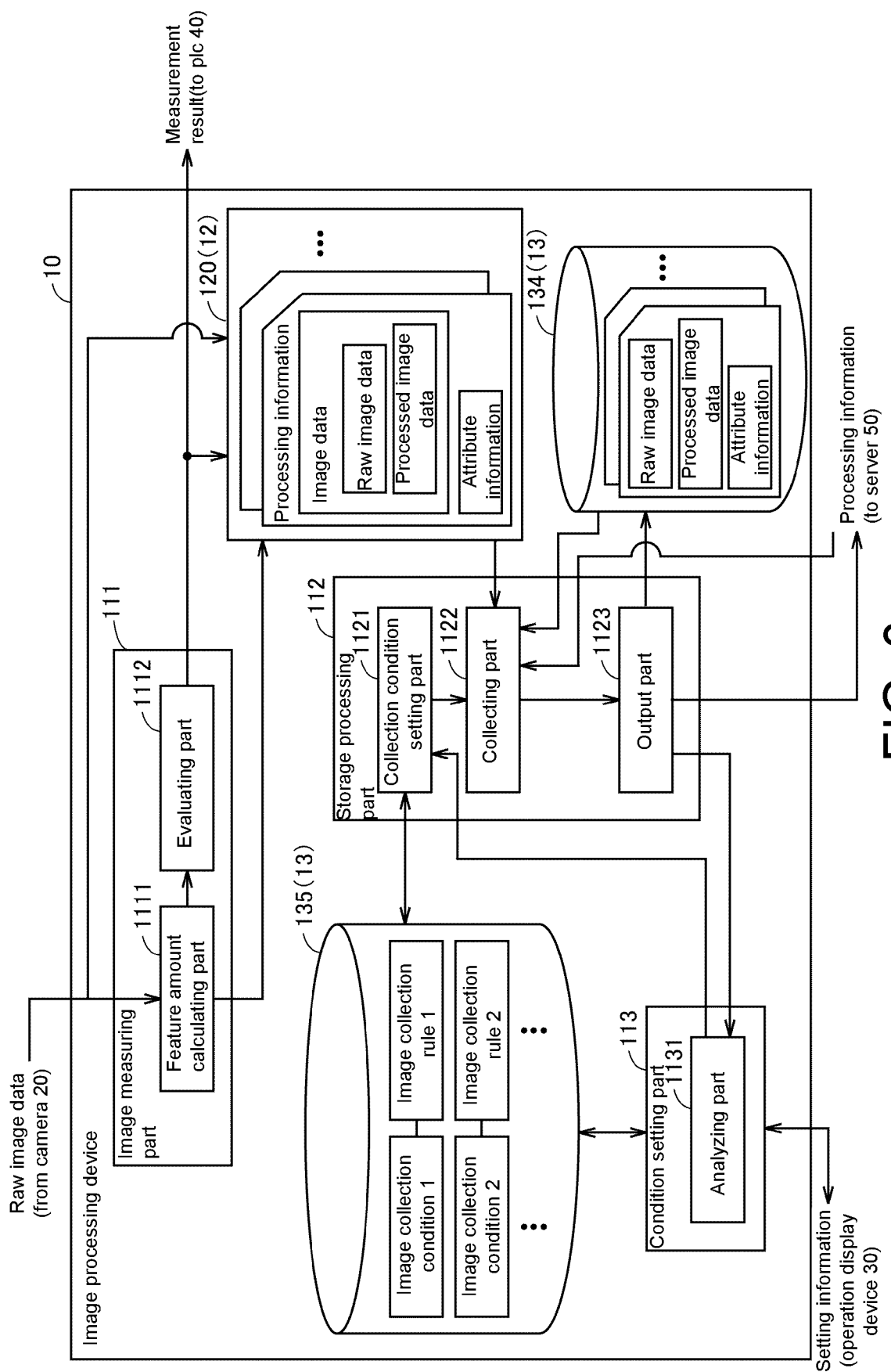
FIG. 3 is a view illustrating an example of a functional configuration of an image processing device.

The overall function of the image processing device 10 will be described with reference to FIG. 3. FIG. 3 is a view illustrating an example of a functional configuration of the image processing device 10. By developing the image measurement program 131 in the main memory 12 and executing the image measurement program 131, the CPU 11 functions as an image measuring part 111. The image measurement program 131 is a program for performing visual inspection of the object W, acquisition of position information of the object W, quality inspection of the object W, and the like on the basis of the image data generated by the camera 20 capturing an image of the object W. The image measuring part 111 includes a feature amount calculating part 1111 and an evaluating part 1112.

By developing the storage program 132 in the main memory 12 and executing the storage program 132, the CPU 11 functions as a storage processing part 112 and a condition setting part 113. The storage processing part 112 stores processing information obtained by the image measurement performed by the image measuring part 111 in a specific storage part of one or a plurality of storage parts. The storage processing part 112 includes a collection condition setting part 1121, a collecting part 1122, and an output part 1123. The condition setting part 113 sets a storage condition when storing processing information. The condition setting part 113 includes an analyzing part 1131.

The main memory 12 includes a buffer area 120 for temporarily storing processing information. The hard disk 13 includes a measurement result DB 134 that functions as a storage part for storing processing information that satisfies a storage condition, and a storage condition DB 135 that functions as a storage part for storing a storage condition.

The camera 20 generates image data. Hereinafter, image data generated by the camera 20 will also be referred to as "raw image data."

The feature amount calculating part 1111 calculates a feature amount included in the raw image data input from the camera 20. The raw image data input from the camera 20 is temporarily stored in the buffer area 120. Information different from the raw image data such as the time at which the raw image data is captured and imaging conditions may also be temporarily stored in the buffer area 120. The feature amount calculating part 1111 may process the raw image data to improve accuracy of the measurement result and generate processed image data. Such processing is a process performed to improve accuracy of the measurement result and includes, for example, a process of removing noise or unevenness from raw image data, a process of changing a contrast of raw image data, and the like. The processed image data is an image obtained in a process of the processing. Hereinafter, the raw image data and the processed image data will also be simply referred to as "image data." When the processing is performed, the feature amount calculating part 1111 calculates a feature amount from the processed image data. The feature amount calculating part 1111 temporarily stores the obtained feature amount, processed image data obtained by processing performed as necessary, a processing condition of the processing, and the like in the buffer area 120. The feature amount calculated by the feature amount calculating part 1111 is sent to the evaluating part 1112.

The evaluating part 1112 evaluates the object W on the basis of the feature amount of the image data sent from the feature amount calculating part 1111. The evaluating part 1112 compares a predetermined threshold value for evaluation with the feature amount, thereby evaluating the object W. The evaluating part 1112 temporarily stores a measurement result, which is a result of the evaluation of the object W, and the threshold value for evaluation in the buffer area 120. The result of the evaluation of the object W evaluated by the evaluating part 1112 is sent to the PLC 40 as a measurement result.

Processing information is stored in the buffer area 120 for each measurement result. The processing information is information obtained by image measurement, and includes image data and attribute information. As described above, the image data includes raw image data and processed image data. The attribute information is data indicating a result of image measurement, which is different from the image data, and is data having a smaller size in comparison to the image data. Data having a smaller size in comparison to the image data may include, for example, text data. The attribute information includes data obtained regardless of whether image measurement is performed and data obtained by image measurement. Data obtained regardless of whether image measurement is performed may include, for example, a time at which raw image data is acquired, data on manufacturing conditions such as a manufacturing number of the object W, data indicating image measurement conditions, parameters used for feature amount calculation or evaluation, and the like. Data obtained by image measurement is data obtained in a process of image measurement, and includes a feature amount extracted from image data and a measurement result.

The collection condition setting part 1121 sets image collection conditions for collecting processing information from storage parts such as the buffer area 120, the measurement result DB 134, and the server 50, and image collection rules for specifying an output format of the collected processing information and an output destination of the collected processing information. The output destination includes a storage part such as the measurement result DB 134 and the server 50, and the analyzing part 1131 that analyzes processing information. Conditions set by the collection condition setting part 1121 include a storage condition to be output to the storage part and a storage condition for analysis to be output to the analyzing part 1131.

A case in which the collection condition setting part 1121 sets a storage condition to be output to the storage part will be described. The collection condition setting part 1121 sets a storage condition for storing the processing information temporarily stored in the buffer area 120 into the storage part. The storage condition includes an image collection condition for collecting processing information to be stored from among pieces of processing information temporarily stored in the buffer area 120 and an image collection rule for specifying a manner of storing collected processing information. The collection condition setting part 1121 specifies the storage condition from the storage condition DB 135 and sets the storage conditions.

When storing the processing information in the storage part, the collecting part 1122 collects, from among the pieces of processing information temporarily stored in the buffer area 120, the processing information that satisfies an image collection condition set by the collection condition setting part 1121 and sends the collected processing information to the output part 1123. The output part 1123 outputs the sent processing information according to an image collection rule set by the collection condition setting part 1121. The storage processing part 112 repeats setting of storage conditions, collection of processing information, and outputting of processing information until collection and output of processing information based on all valid storage conditions among storage conditions stored in the storage condition DB 135 are completed.

A case in which the collection condition setting part 1121 sets a storage condition for analysis will be described. When setting information for changing storage conditions stored in the condition setting part 113 and the storage condition DB 135 or setting information for newly setting a storage condition is input from the touch panel 32 of the operation display device 30, the collection condition setting part 1121 is instructed to set a storage condition corresponding to the setting information. The collection condition setting part 1121 sets a storage condition according to an instruction of the analyzing part 1131. Then, the collecting part 1122 collects processing information according to the set storage condition, and the output part 1123 sends the collected processing information to the analyzing part 1131. The analyzing part 1131 sends the sent processing information to the operation display device 30 for the processing information to be displayed on the display part 31 of the operation display device 30.

The condition setting part 113 updates the image collection condition and the image collection rule stored in the storage condition DB 135 on the basis of the setting information input from the operation display device 30.

All or some of the functional configuration of the image processing device 10 illustrated in FIG. 3 may be realized using a hard-wired circuit such as an Application Specific Integrated Circuit (ASIC) and a Field Programmable Gate Array (FPGA). Among the functional configurations of the image processing device 10, the storage processing part 112 and the condition setting part 113 achieved by executing the storage processing program may be configured in a storage processing device which is different from the image processing device 10. In this case, the storage processing device may store the measurement result DB 134 and the storage condition DB 135. Besides, the measurement result DB 134 and the storage condition DB 135 may be stored in a different server. In this way, a processing load on the CPU 11 of the image processing device 10 may be reduced. The storage processing part 112 and the condition setting part 113 achieved by executing the storage processing program may be included in the PLC 40.

[D. Storage Processing]

Figure 4:
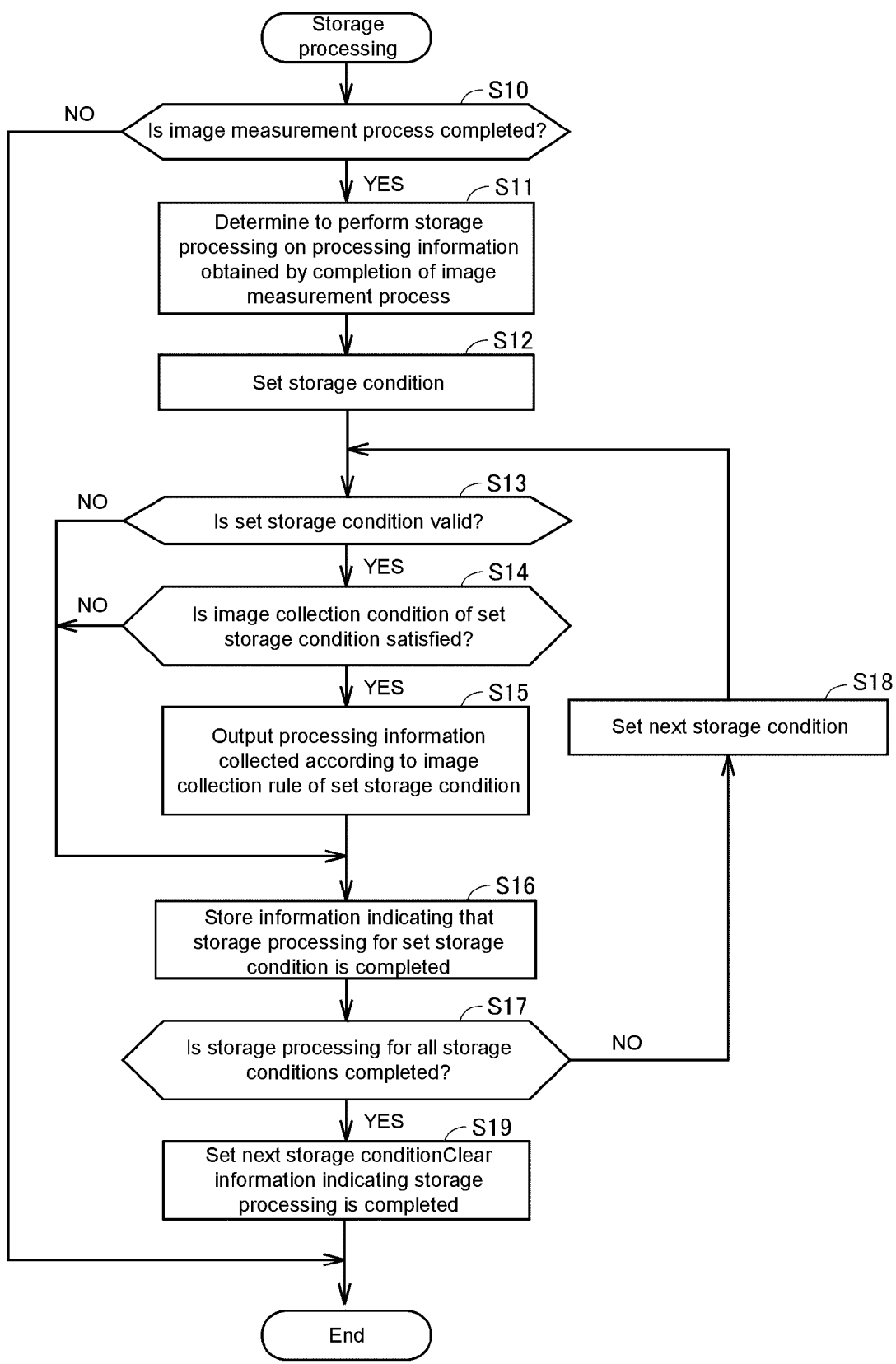
FIG. 4 is as flowchart of storage processing.

Storage processing performed when the storage processing part 112 outputs processing information to the storage part will be described with reference to FIG. 4. FIG. 4 is a flowchart of the storage processing. The storage processing is a process realized by the CPU 11. In the present embodiment, the storage processing is performed every time a single image measurement process ends. The storage processing may also be a process performed at predetermined intervals. In one embodiment, when the storage processing is performed at predetermined intervals, the CPU 11 sets a time between the start of processing and the start of the next processing as time before all information temporarily stored in the buffer area 120 is replaced with other information when processing is started.

In Step S10, the CPU 11 determines whether an image measurement process is completed. Here, the image measurement process is a process performed by the image measuring part 111, and is a process of calculating a feature amount from raw image data input from the camera 20 and evaluating the calculated feature amount. When it is determined that the image measurement process is not completed (NO in Step S10), the CPU 11 ends the processing.

When it is determined that the image measurement process is completed (YES in Step S10), the CPU 11 switches control to Step S11.

In Step S11, the CPU 11 decides to perform storage processing on processing information obtained by the completion of the image measurement process.

In Step S12, the CPU 11 sets a storage condition. Specifically, the CPU 11 extracts a storage condition from the storage condition DB 135 and sets the storage condition.

In Step S13, the CPU 11 determines whether the set storage condition is valid. When, the set storage condition is not valid (NO to Step S13), the CPU 11 switches control to Step S16.

When the set storage condition is valid (YES to Step S13), the CPU 11 switches control to Step S14.

In Step S14, the CPU 11 determines whether the processing information is processing information that satisfies an image collection condition of the set storage condition. When it is determined that the processing information does not satisfy the image collection condition (NO to Step S14), the CPU 11 switches control to Step S16.

When it is determined that the processing information satisfies the image collection condition (YES to Step S14), the CPU 11 switches control to Step S15.

In Step S15, the CPU 11 outputs the processing information according to an image collection rule of the set storage condition.

In Step S16, the CPU 11 stores information indicating that the storage processing on the set storage condition has been completed in the main memory 12.

In Step S17, the CPU 11 determines whether storage processing for all storage conditions is completed. When it is determined that storage processing for all of the storage conditions is completed (YES to Step S17), the CPU 11 switches control to Step S19.

In Step S19, the CPU 11 clears information indicating whether storage processing stored for each of the storage conditions in the main memory 12 is completed, thereby ending the storage processing.

When it is determined that storage processing for all of the storage conditions is not completed (NO to Step S17), the CPU 11 switches control to Step S18. In Step S18, the CPU 11 sets the next storage condition. The CPU 11 repeats the process from Step S13 to Step S18 until it is determined, in Step S17, that storage processing for all of the storage conditions is completed.

[E. Storage Example]

Figure 5:
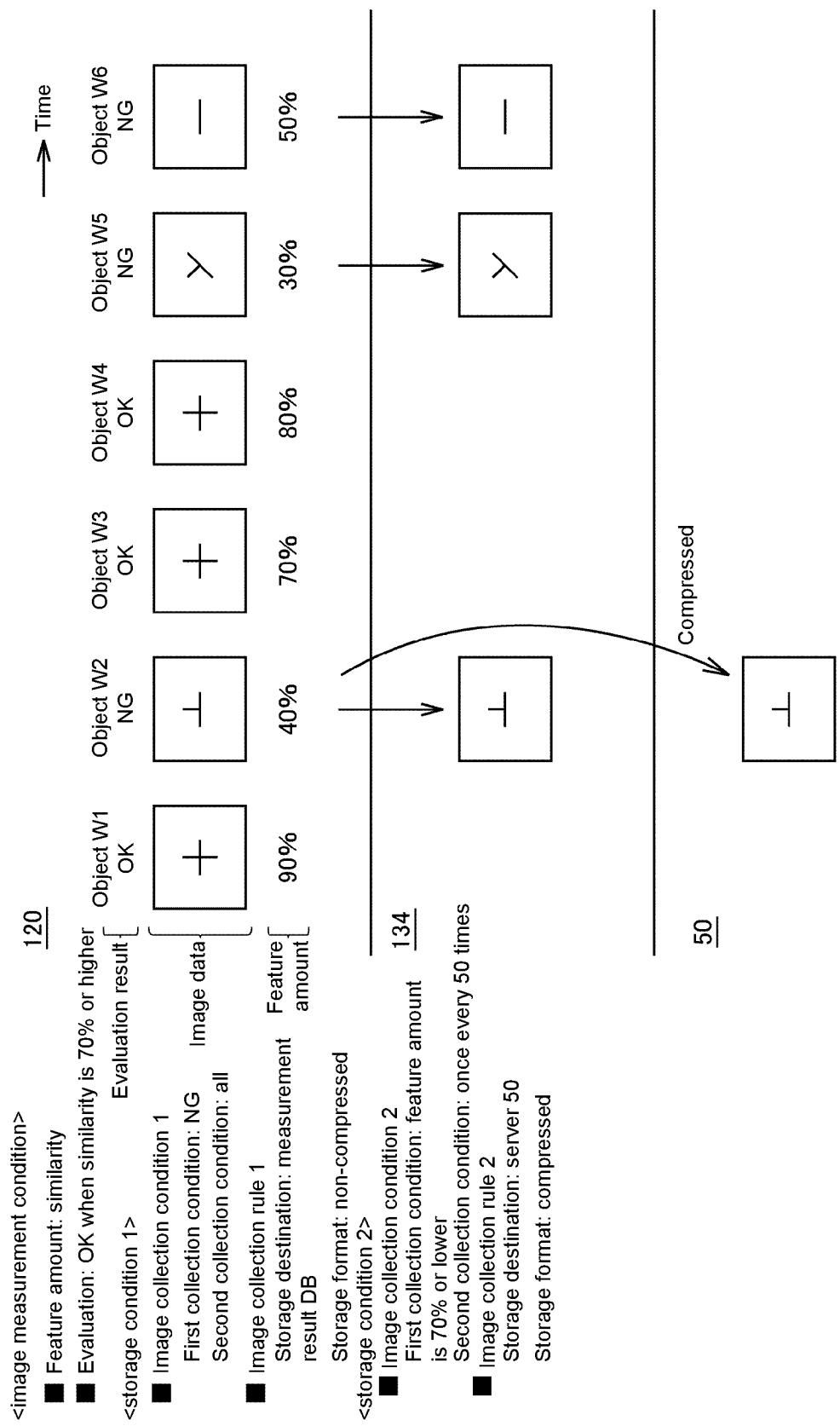
FIG. 5 is a schematic diagram illustrating a state in which a storage processing part stores processing information in a storage part according to each of a plurality of storage conditions.

A storage example when the storage processing part 112 performs storage processing will be described with reference to FIG. 5. FIG. 5 is a schematic diagram illustrating a state in which the storage processing part 112 stores processing information in a storage part according to each of a plurality of storage conditions. The upper part of FIG. 5 illustrates the inside of the buffer area 120. The middle part of FIG. 5 illustrates the inside of the measurement result DB 134. The lower part of FIG. 5 illustrates the inside of the server 50. In FIG. 5, it is assumed that the image measurement process is performed for each object W. When an image measurement process on an object W1 is finished, an image measurement process on an object W2 is performed, and the image measurement process is sequentially ended and started repeatedly.

In FIG. 5, the feature amount calculating part 1111 performs pattern matching and calculates a similarity between a reference image and an image of an object as a feature amount. The evaluating part 1112 sets 80% as a threshold value for evaluation and evaluates that a product as a qualified product (OK) when the feature amount thereof is 80% or higher.

As described above, a storage condition includes an image collection condition and an image collection rule. The image collection condition includes a first collection condition and a second collection condition. The image collection rule includes a storage destination rule and a storage format rule.

The first collection condition is a condition set in relation to a feature amount. For example, the first collection condition may be a condition set in relation to a result of evaluation like Image Collection Condition 1 of FIG. 5 or a condition set independently from the result of evaluation like Image Collection Condition 2 of FIG. 5.

The second collection condition is a condition set to specify a frequency by which the collected object that satisfies the first collection condition is stored. For example, the second collection condition may be a condition that specifies that all of the objects to be collected that satisfy the first collection condition be stored as in Image Collection Condition 1 of FIG. 5, or may be a condition that some of the objects to be collected that satisfies the first collection condition be stored as in Image Collection Condition 2 of FIG. 5. Here, the second collection condition of Image Collection Condition 2 of FIG. 5 is a condition that specifies that processing information determined as objects to be collected be stored once every 50 times and is a condition set independently from the feature amount.

The storage destination may be selected from the plurality of storage parts including the hard disk 13 included in the image processing device 10, the server 50 connected to the image processing device 10 via the NW 2, and the external memory 60. An example in which the storage destination is the measurement result DB 134 in the hard disk 13 and an example in which the storage destination is the server 50 are illustrated in FIG. 5.

The storage format includes a non-compressed format in which data is not compressed and a compressed format in which data is compressed. The compressed format may include a reversible compressed format in which restoration to data before compression is possible and an irreversible compressed format in which restoration to data before compression is impossible. An example in which a storage format is a non-compressed format and an example in which a storage format is a compressed format are illustrated in FIG. 5.

For example, in a case in which Storage Condition 1 and Storage Condition 2 illustrated in FIG. 5 are set to be valid, when the image measurement process on the object W1 is ended, the storage processing part 112 performs storage processing on the basis of Storage Condition 1 and Storage Condition 2. In the example of FIG. 5, because processing information obtained as a result of the image measurement process on the object W1 satisfies neither Image Collection Condition 1 nor Image Collection Condition 2, the processing information is not stored. Then, when the image measurement process on the object W2 is ended, the storage processing part 112 performs storage processing on the basis of Storage Condition 1 and Storage Condition 2.

In the example of FIG. 5, because processing information obtained as a result of the image measurement process on the object W2 satisfies both Image Collection Condition 1 and Image Collection Condition 2, the processing information is stored. The processing information obtained as a result of the image measurement process on the object W2 is stored according to Image Collection Condition 1 and also stored according to Image Collection Condition 2.

In this way, the storage processing part 112 determines whether to store processing information obtained as a result of image processing, how to store the processing information, and performs a process as determined accordingly.

[F. Screen for Setting Storage Condition]

Figure 6:
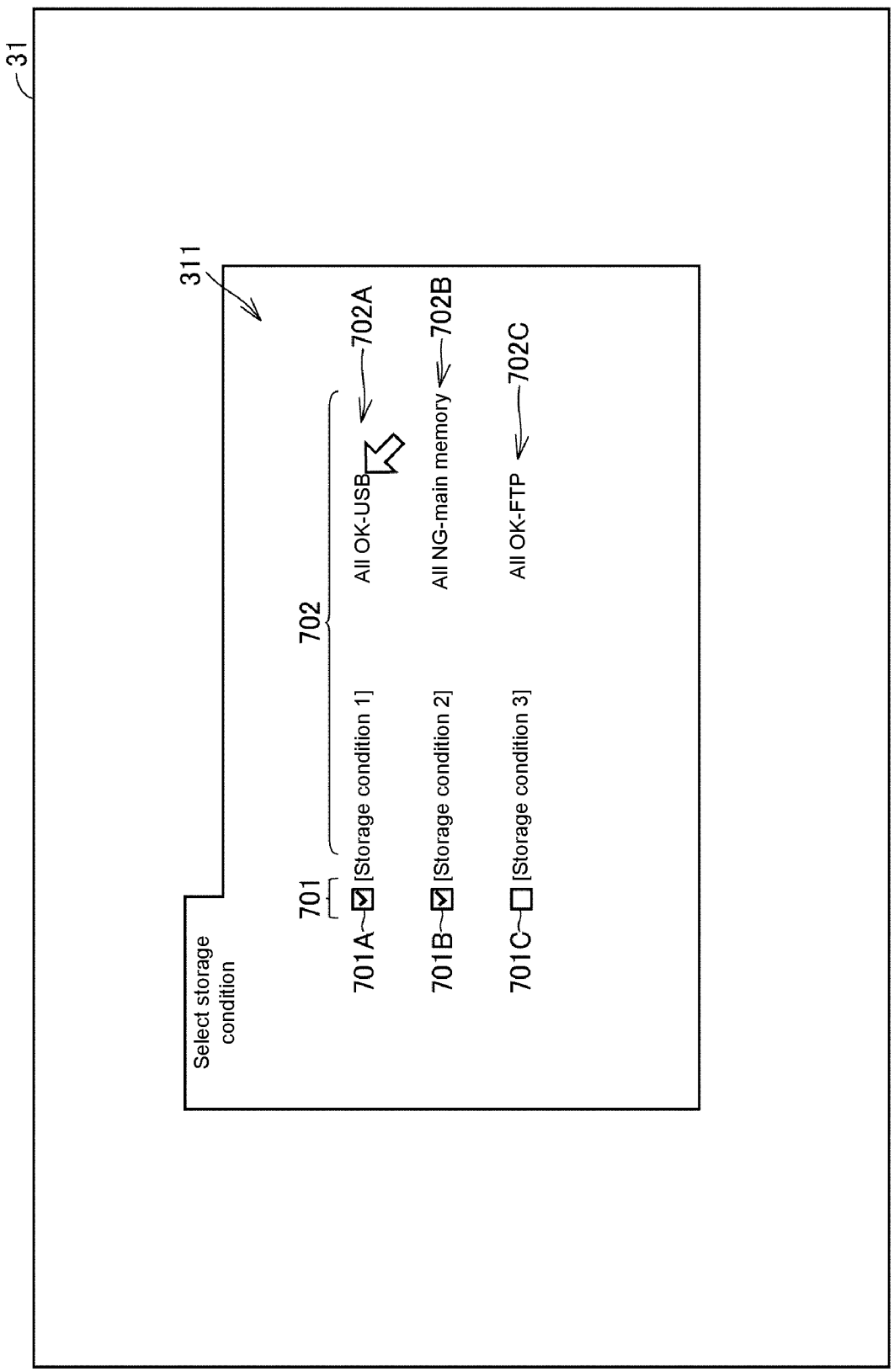
FIG. 6 is a view illustrating an example of a storage condition selection screen when setting validity/invalidity of a storage condition.

A display mode displayed on the display part 31 when setting a storage condition will be described using FIGS. 6 to 10. FIG. 6 is a view illustrating an example of a storage condition selection screen 311 when setting validity/invalidity of a storage condition. A user may check a checkbox 701 to select a storage condition that the user wants to make valid. By selecting a text area 702, the user may switch the storage condition selection screen 311 to a detailed setting screen 312 for setting details of the selected storage condition.

In FIG. 6, an example in which Storage Condition 1 and Storage Condition 2 are made valid while Storage Condition 3 is made invalid by checking a checkbox 701A and a checkbox 701B is illustrated and without checking a checkbox 701C. In this way, while setting of a storage condition is left, whether to make the storage condition valid or invalid may be easily selected.

Information displayed in the text area 702 (i.e., text area 702A, 720B, 702C), is information in which content set as a storage condition is summarized. From this, the user may easily select a storage condition that he or she wants to make valid or invalid.

Figure 7:
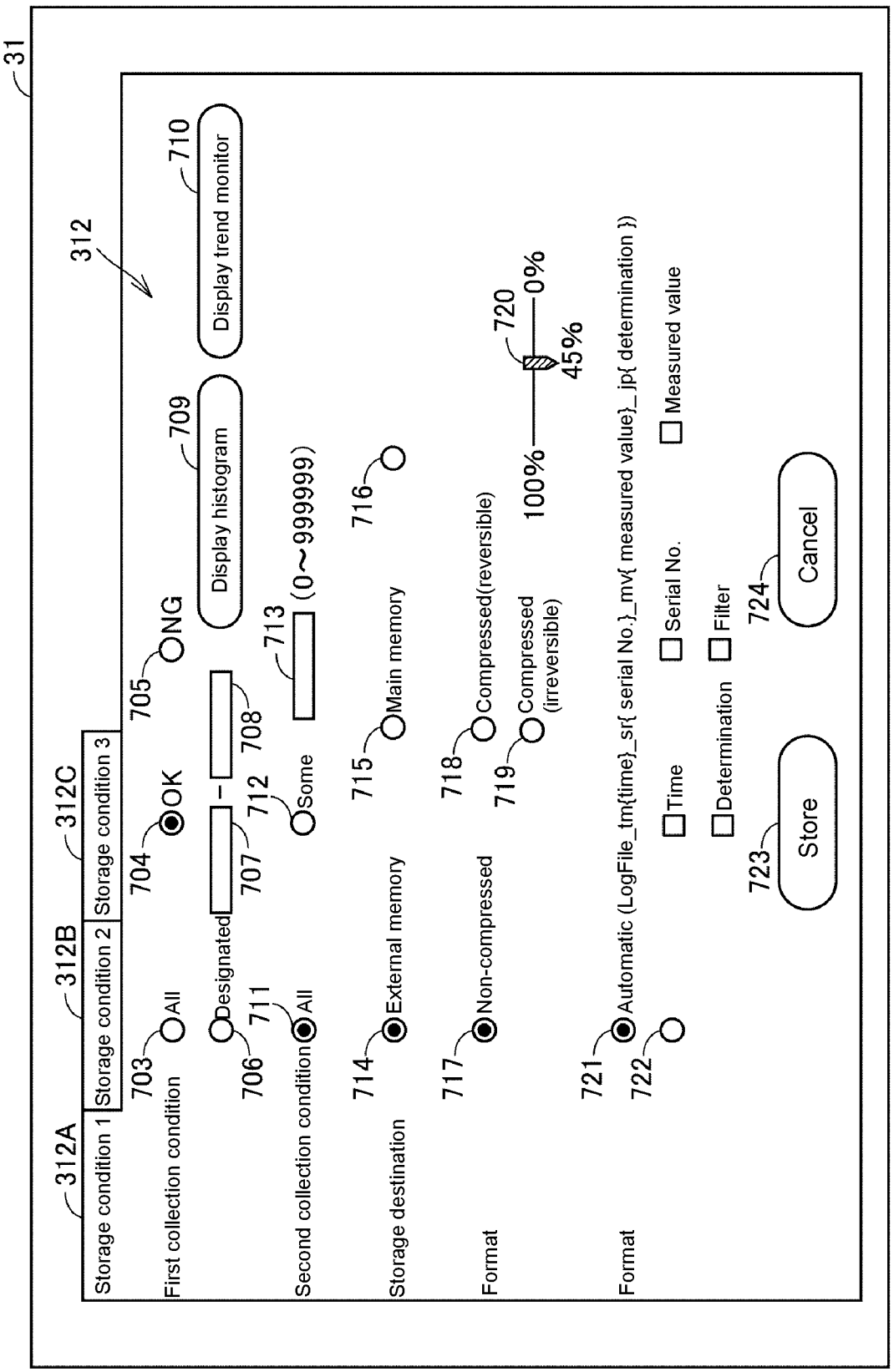
FIG. 7 is a view illustrating an example of an advanced setting screen for setting details of a storage condition.

FIG. 7 is a view illustrating an example of the detailed setting screen 312 for setting content of a storage condition. For example, the detailed setting screen 312 illustrated in FIG. 7 is a detailed setting screen 312A for Storage Condition 1 displayed when the text area 702A is selected in the storage condition selection screen 311 illustrated in FIG. 6. The user may select a tab labeled "Storage Condition 2" to switch the detailed setting screen 312A for Storage Condition 1 to a detailed setting screen 312B for Storage Condition 2, and likewise, may select a tab labeled "Storage Condition 3" to switch the detailed setting screen 312A for Storage Condition 1 to a detailed setting screen 312C for Storage Condition 3.

The user may set an image collection condition and an image collection rule. In FIG. 7, a first collection condition and a second collection condition are shown as examples of the image collection condition.

As described above, the first collection condition is a condition set in relation to a feature amount. The condition set in relation to a feature amount includes a condition established according to a result evaluated on the basis of a feature amount and a condition set independently from the condition established according to the evaluated result. For example, when whether the object W is an OK product or an NG product is evaluated on the basis of a feature amount, the user may set whether to set image data belonging to an OK product as an object to be collected, whether to set image data belonging to an NG product as an object to be collected, or whether to set entire image data as an object to be collected regardless of whether the image data belonging to an OK product or an NG product by selecting any one of an "OK" icon 704, an "NG" icon 705, and an "All" icon 703.

The user may set a range of a feature amount as an object to be collected separately from a threshold value of a feature amount used for evaluating the object W by the evaluating part 1112, and the range of the feature amount may be set through selecting a "designated" icon 706 in the drawing and inputting numerical values in a frame 707 for a lower limit value and a frame 708 for an upper limit value provided on the right side of the "designated" icon 706.

In the present embodiment, the image processing device 10 has a support function for facilitating setting the range of the feature amount. Specifically, by selecting a "Display histogram" icon 709 or a "Display trend monitor" icon 710 in the drawing, the user may visualize a result of collection in which processing information is collected according to a set collection condition. The user may change the set collection condition on the basis of the visualized result of collection even without inputting a numerical value in the frame 707 for the lower limit value or the frame 708 for the upper limit value.

The second collection condition is a condition for setting whether to store, among pieces of processing information that satisfy the first collection condition, all of the pieces of processing information or some of the pieces of processing information. When all of the pieces of processing information that satisfy the first collection condition are stored, as illustrated in FIG. 7, an "All" icon 711 is selected. When some of the pieces of processing information that satisfy the first collection condition are stored, a "Some" icon 712 is selected, and the number of pieces of processing information to be stored, among the entire pieces of processing information satisfying the first collection condition, is input in a frame 713 at the right side of the "Some" icon 712. For example, when "100" is input, processing information is stored once every 100 times.

In the present embodiment, the image collection rule includes a storage destination, a storage format (hereinafter also referred to as "format"), and a storage name. The storage name is a name given to information when the information is stored.

The user may select a storage destination of pieces of processing information that satisfy the first collection condition and the second collection condition from a plurality of storage destinations. In FIG. 7, as storage destinations, an external memory that may be directly connected to the image processing device 10 via an I/F provided in the image processing device 10, a main memory provided in the image processing device 10, and a server connected to the image processing device 10 via the Internet are provided. For example, the user may select any one of an "external memory" icon 714, a "main memory" icon 715, and a "server" icon 716 to select a storage destination. In FIG. 7, an example in which the external memory is selected as the storage destination is illustrated.

The user may select a storage format of an image included in the pieces of processing information that satisfy the first collection condition and the second collection condition from a plurality of storage formats. In FIG. 7, as storage formats, a non-compressed format in which data is not compressed, a reversible compressed format in which data is able to be restored to a state before compression, and an irreversible compressed format in which data is unable to be restored to a state before compression are provided. For example, the user may select any one of a "Non-compression" icon 717, a "Compression (reversible)" icon 718, and a "Compression (irreversible)" icon 719 to select a storage format. When the irreversible compressed format is selected, a compression rate may be set by moving a scale 720. In FIG. 7, an example in which the non-compressed format is selected, and the compression rate is set as 45% is illustrated. The compression rate may be selected even when the reversible compressed format is selected.

The user may set names to be given to the pieces of processing information satisfying the first collection condition and the second collection condition when the pieces of processing information are stored. Information arbitrarily selected by the user may be set as a storage name, or predetermined information may be set as a storage name. When an "Automatic" icon 721 in FIG. 7 is selected, predetermined information of pieces of information included in the pieces of processing information is set as a storage name. When a "Manual" icon 722 in FIG. 7 is selected, information arbitrarily selected by the user may be set as a storage name. For example, when the "Manual" icon 722 is selected, and a serial number and a determination are selected as pieces of information to be included in a storage name, processing information is stored so that a serial number and a result of determination constitute a storage name.

When a "Store" icon 723 is selected, information of the storage condition DB 135 is overwritten by the selected storage condition, and the screen is switched to the storage condition selection screen 311. When a "Cancel" icon 724 is selected, the changed information is destroyed, and the screen is switched to the storage condition selection screen 311.

The image collection condition may include a third collection condition for selecting a piece of information to be stored among a plurality of pieces of information obtained by performing image measurement one time. For example, the third collection condition through which image data to be stored may be selected from raw image data and processed image data may be set. Further, a storage format may be selected for each piece of image data. In this way, the user may set raw image data to be stored in the non-compressed format or the reversible compressed format and set processed image data to be stored in the irreversible compressed format.

[G. Visualization of Result of Collection]

Figure 8:
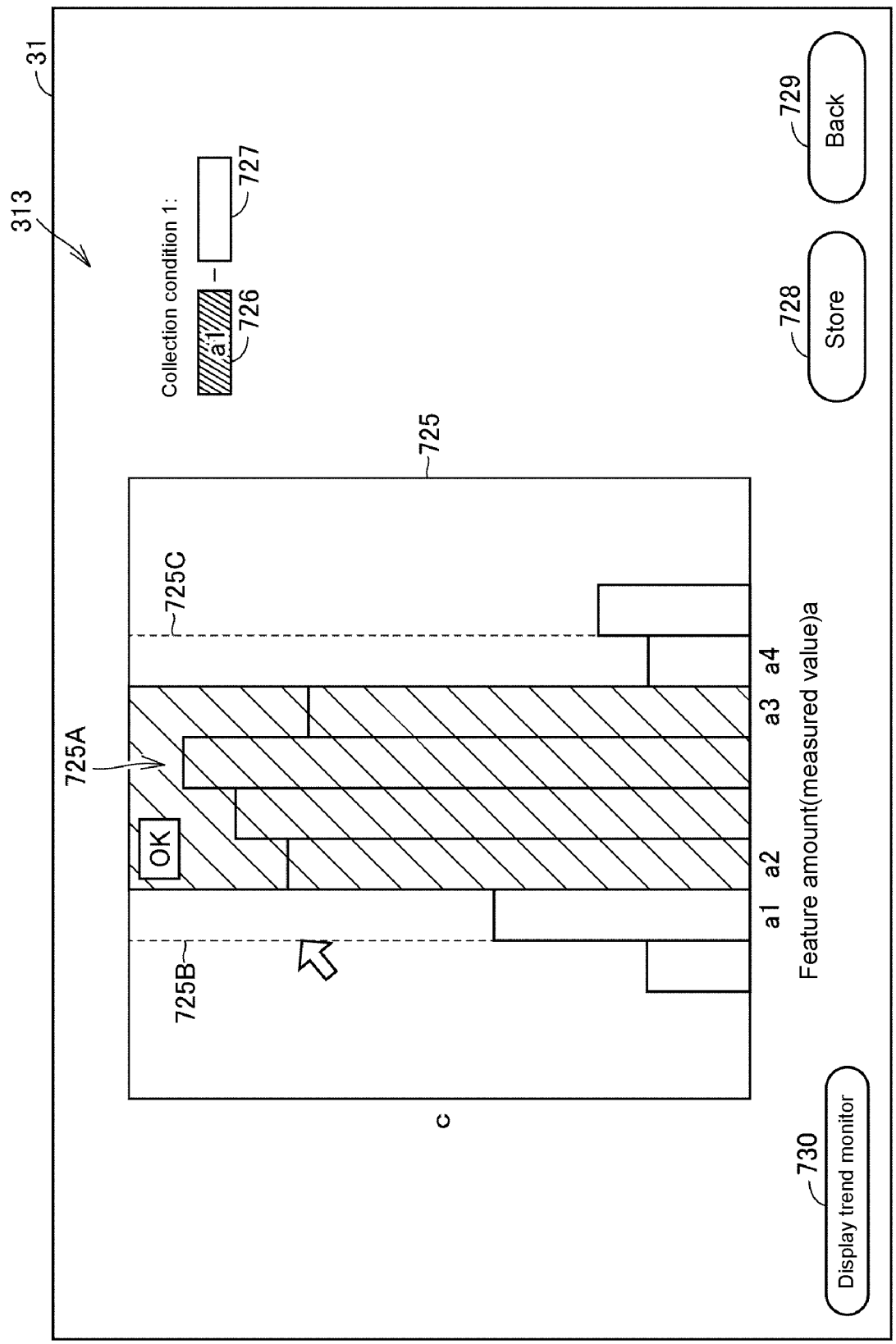
FIG. 8 is an example of a histogram screen when a result of collection is visualized as a histogram.
Figure 9:
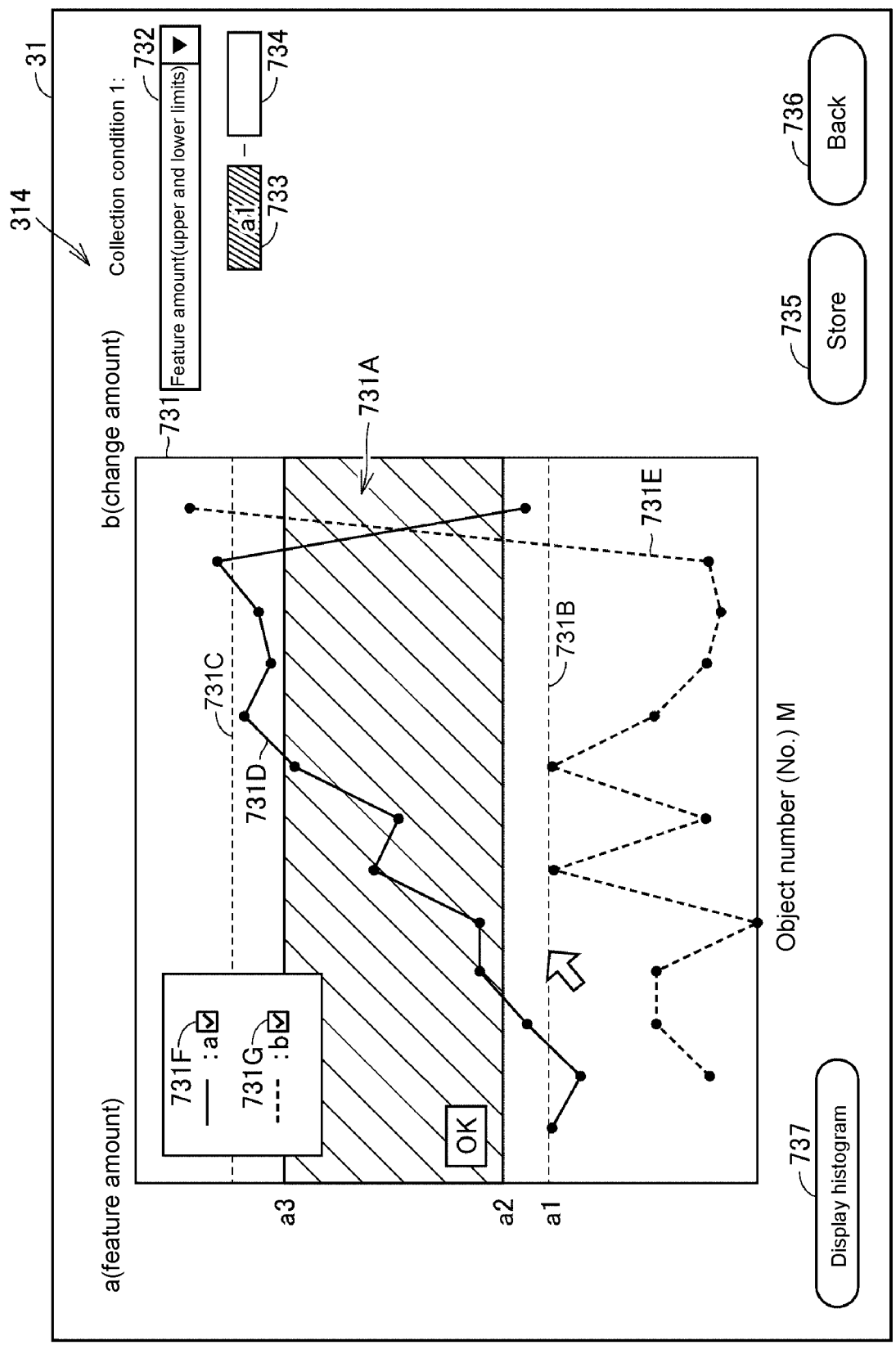
FIG. 9 is an example of a trend monitor screen when a result of collection is visualized as a trend monitor.
Figure 10:
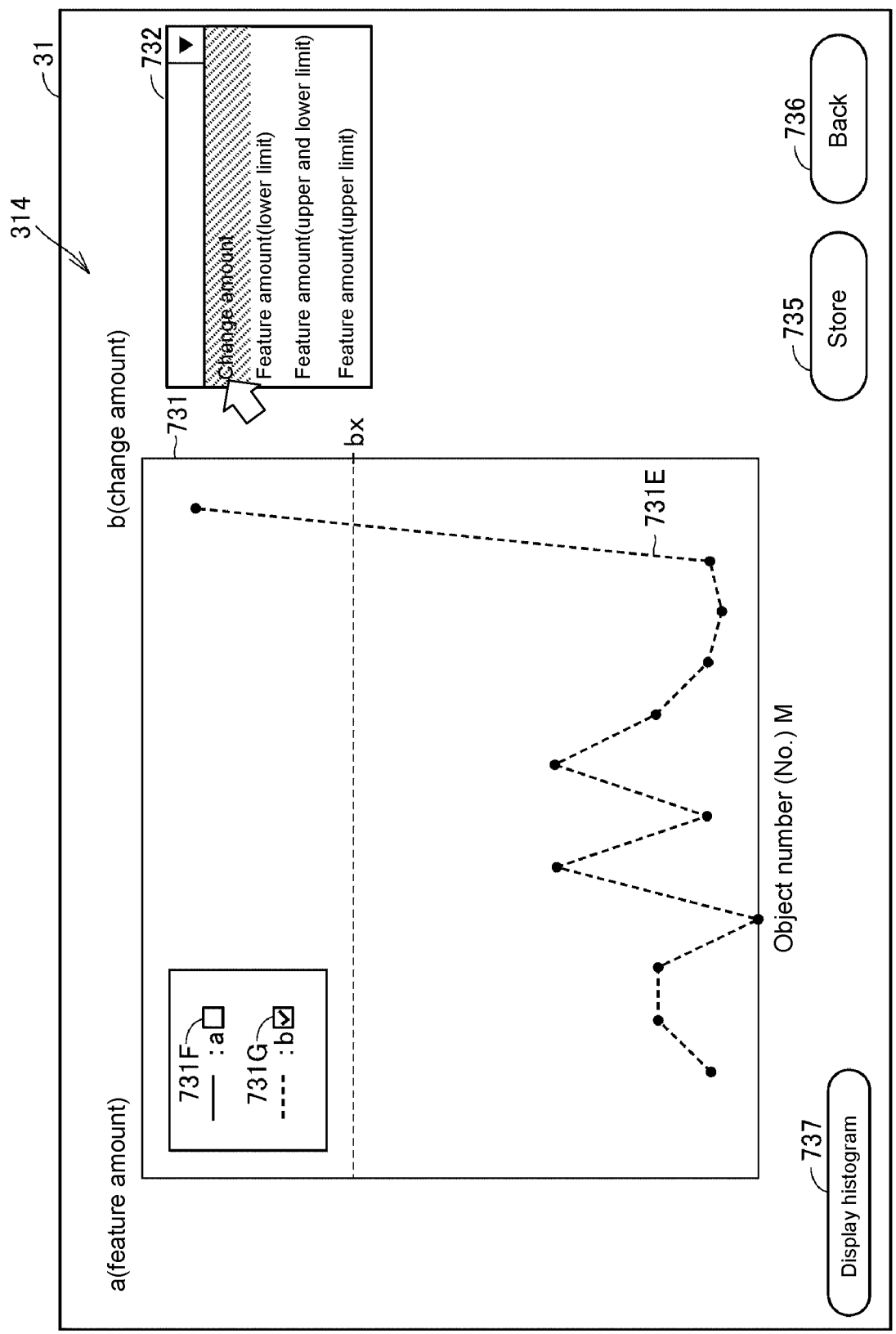
FIG. 10 is an example of a trend monitor screen when a result of collection is visualized as a trend monitor.

Visualization of a collected result of collection will be described with reference to FIGS. 8 to 10. FIG. 8 is an example of a histogram screen 313 when a result of collection is visualized as a histogram. FIGS. 9 and 10 are examples of a trend monitor screen when a result of collection is visualized as a trend monitor. Visualization of a result of collection is realized by the analyzing part 1131 instructing display content to the operation display device 30, and the operation display device 30 displaying a result of the instructed content on the display part 31.

When the "Display histogram" icon 709 or the "Display trend monitor" icon 710 in FIG. 7 is selected, the analyzing part 1131 assumes that an instruction related to visualization of a result of collection is received, and instructs the operation display device 30 to display processing information collected with a selected image collection condition in a selected display format. The range in which processing information is collected may be predetermined or set by the user. When an image collection condition is not selected, the analyzing part 1131 may instruct all pieces of processing information within a predetermined period to be collected.

When the "Display histogram" icon 709 in FIG. 7 is selected, the screen is switched to a screen illustrated in FIG. 8. The horizontal axis of a histogram 725 illustrated in FIG. 8 indicates a measured feature amount a, and the vertical axis indicates the number c of objects W at which the feature amount a is achieved. Threshold values ('a2' and 'a3' in the drawing) used when the evaluating part 1112 evaluates an object W are displayed in the histogram 725. The analyzing part 1131 may instruct the operation display device 30 so that an area in which objects W are determined as an OK product is indicated with oblique lines 725A for the number of objects W determined as an OK product to be visually recognized.

Dotted lines 725B and 725C illustrated in FIG. 8 are threshold values of the feature amount a set as a collection condition. As illustrated in FIG. 8, the user may align a cursor indicated with an arrow with a dotted line to change a threshold value based on the feature amount a by moving the dotted line. For example, by the user moving the dotted line 725B to a position of a threshold value that he or she desires to set as a collection condition, a feature amount 'a1' at a position of the dotted line 725B is input as a threshold value in a frame 726 for a lower limit value of a collection condition displayed at the right side of the histogram. For example, by the user moving the dotted line 725C to a position of a threshold value that he or she desires to set as a collection condition, a feature amount 'a4' at a position of the dotted line 725C is input as a threshold value in a frame 727 for a upper limit value of a collection condition displayed at the right side of the histogram.

When a "Store" icon 728 is selected, the collection condition selected in the histogram screen 313 is updated, and the screen is switched to the detailed setting screen 312. When a "Back" icon 729 is selected, an update is not performed with the collection condition selected in the histogram screen 313, and the screen is switched to the detailed setting screen 312.

When the "Display trend monitor" icon 710 in FIG. 7 is selected, the screen is switched to a trend monitor screen 314 illustrated in FIG. 9 or FIG. 10. In the present embodiment, description will be given by assuming that the screen is switched to the trend monitor screen 314 in FIG. 9. In FIGS. 9 and 10, the horizontal axis of a trend monitor 731 indicates an object number (No.) M, the vertical axis at the left side indicates a feature amount a, and the vertical axis at the right side indicates a change amount b. The feature amount a indicated by the vertical axis at the left side is a feature amount a included in image data in which the object No. M is captured. The change amount b indicated by the vertical axis at the right side is a difference between a feature amount included in image data in which an object W is captured and a feature amount included in image data of an object W captured right before the above object W.

In FIG. 9, a solid broken-line graph 731D is a graph indicating a change in the feature amount a. In FIGS. 9 and 10, a dotted broken-line graph 731E is a graph indicating a change in the change amount b. A graph to be displayed on the display part 31 may be selected by checking checkboxes 731F and 731G within a frame displayed at an upper left side in FIGS. 9 and 10. For example, in FIG. 9, because both the checkbox 731F for the feature amount a and the checkbox 731G for the change amount b are checked, the solid broken-line graph 731D indicating the change in the feature amount a and the dotted broken-line graph 731E indicating the change in the change amount b are displayed on the display part 31. In FIG. 10, because only a checkbox 731G for the change amount b is checked, only the dotted broken-line graph 731E indicating the change in the change amount b is displayed on the display part 31. That is, a graph to be displayed may be easily selected.

In the graph of FIG. 9, threshold values ('a2' and 'a3' in the drawing) for the evaluating part 1112 to determine an object W as an OK product or an NG product when the evaluating part 1112 evaluates the object W is displayed. In the graph of FIG. 9, the range in which objects W are determined as an OK product is indicated with oblique lines 731A.

Dotted lines 731B and 731C illustrated in FIG. 9 are threshold values of a feature amount set as a collection condition. As illustrated in FIG. 9, the user may align a cursor indicated with an arrow with the dotted line 731B and change a threshold value based on the feature amount by moving the dotted line 731B. For example, by the user moving the dotted line 731B to a position of a threshold value that he or she desires to set as a collection condition, a feature amount 'a1' at a position of the dotted line is input as a threshold value in a frame 733 for a lower limit value of a collection condition displayed at the right side of the trend monitor 731.

As illustrated in FIG. 10, as a collection condition, a collection condition set by a value of the change amount may be set in addition to a collection condition set by a value of the feature amount. For example, with a condition that a value of the change amount exceed a predetermined value 'bx', all pieces of processing information may be set as objects to be stored throughout a predetermined period after the above condition is established. For example, by the user selecting a collection condition list display 732 in FIG. 10, items that may be selected as a collection condition are displayed as a list, and by the user selecting any one of the items in the list, the user may perform setting based on the selected collection condition. In FIG. 10, a state in which a collection condition based on a value of a change amount is set is illustrated.

In the screen illustrated in FIGS. 9 and 10, as in the screen in FIG. 8, a "Store" icon 735 and a "Back" icon 736 are provided. When the "Store" icon 735 is selected, a collection condition selected in the trend monitor screen 314 is updated, and the screen is switched to the detailed setting screen 312. When the "Back" icon 736 is selected, an update is not performed with the collection condition selected in the trend monitor screen 314, and the screen is switched to the detailed setting screen 312.

As illustrated in FIGS. 8 to 10, an icon for switching a displayed graph to another graph is displayed. For example, a "Display trend monitor" icon 730 is provided in the histogram screen 313, and the histogram screen 313 is switched to the trend monitor screen illustrated in FIGS. 9 and 10 when the "Display trend monitor" icon 730 is selected. A "Display histogram" icon 737 is provided in the trend monitor screen 314, and the trend monitor screen 314 is switched to the histogram screen illustrated in FIG. 8 when the "Display histogram" icon 737 is selected.

[H. Warning Screen]

Figure 11:
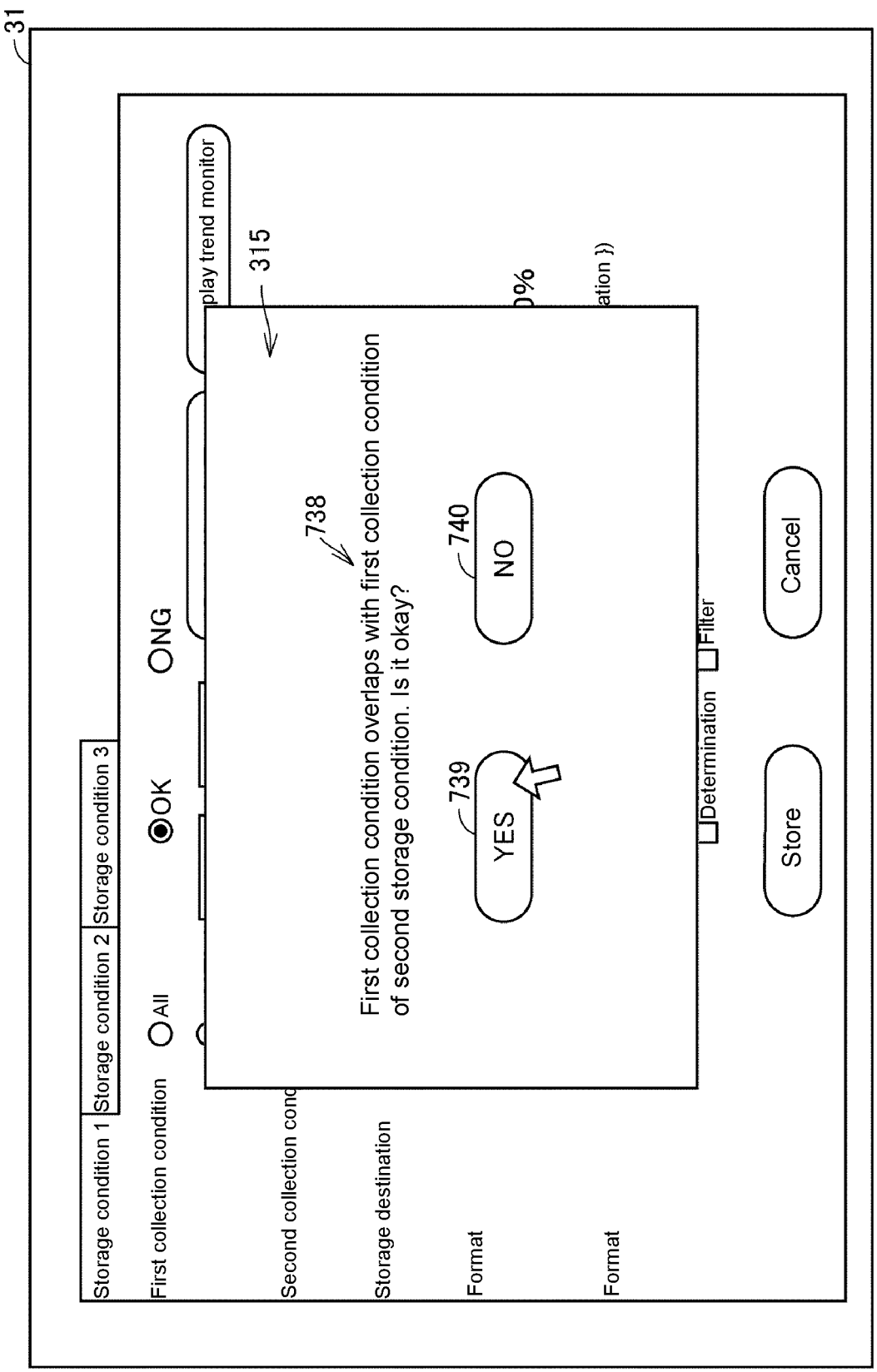
FIG. 11 is an example of a warning screen.

A warning screen 315 that urges the user to review content of a storage condition when the storage condition is set will be described with reference to FIG. 11. FIG. 11 is an example of the warning screen 315. A situation in which content of a storage condition should be reviewed may include a situation in which a portion of or the entire single storage condition overlaps with another storage condition partially or entirely. Specifically, the situation in which content of a storage condition should be reviewed may include a situation in which a single collection condition is included in another collection condition, a situation in which a portion of a single collection condition overlaps with a portion of another collection condition, a situation in which a storage destination and a storage name in a single storage condition are the same as a storage destination and a storage name in another storage condition, and the like.

When a single collection condition overlaps with another collection condition, a single piece of processing information is redundantly stored, and a large memory is consumed in comparison to a case in which collection conditions do not overlap.

For example, the warning screen 315 is displayed after a storage condition is changed and the "Store" icon 723 is operated. The analyzing part 1131 compares the changed storage condition with a plurality of storage conditions stored in the storage condition DB 135. When, as a result of the comparison, there are overlapping storage conditions, the analyzing part 1131 sends information indicating an overlapping part and an overlapping storage condition to the operation display device 30. The operation display device 30 displays the warning screen 315 on the display part 31 on the basis of the sent information.

When reviewing a storage condition according to overlap-indicating content 738 on the warning screen 315, the user may select a "NO" icon 740. When not reviewing a storage condition, the user selects a "YES" icon 739. When the "YES" icon 739 is selected, the condition setting part 113 stores a set storage condition in the storage condition DB 135 or updates a storage condition stored in the storage condition DB with a changed storage condition.

<Modification>

[I. Collection Condition]

Figure 12:
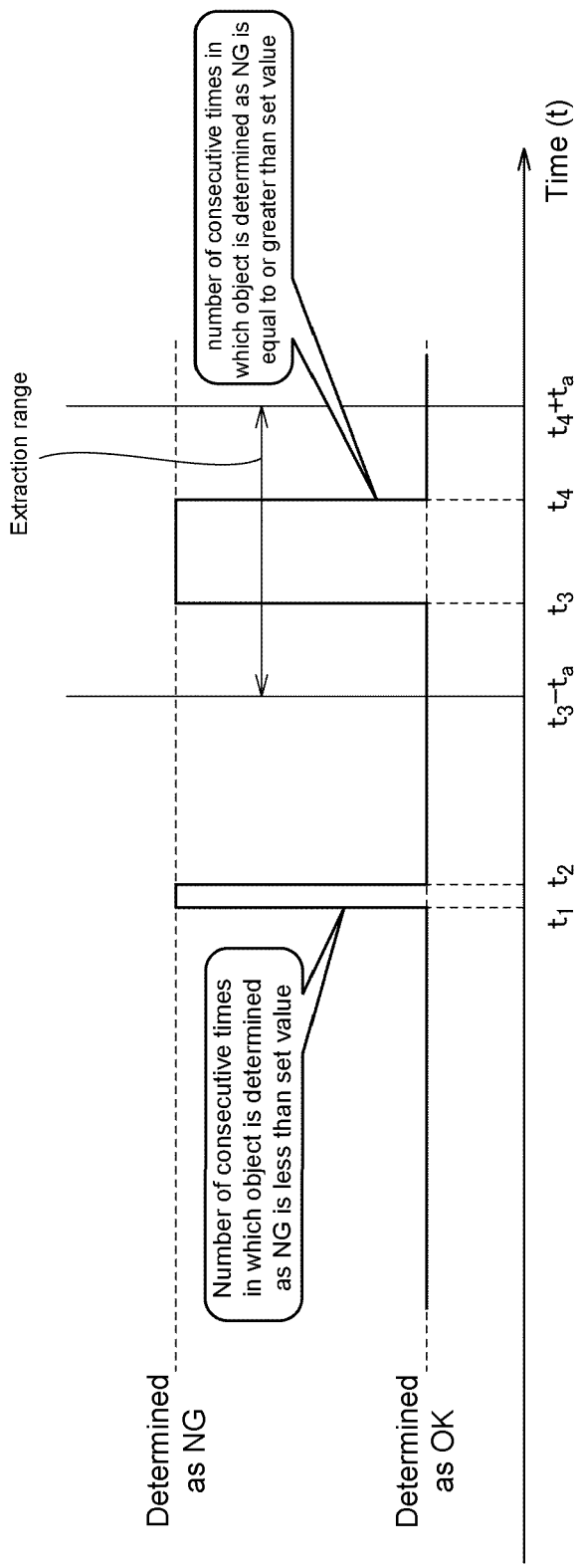
FIG. 12 is a view for describing a modification example of a collection condition.

In the present embodiment, although a condition based on a value of a feature amount or change amount is given as an example of a collection condition, a collection condition is not limited thereto. FIG. 12 is a view for describing a modification of a collection condition.

As illustrated in FIG. 12, when a result of evaluation by the evaluating part 1112 indicates that an object W is an NG product for a predetermined number of consecutive times, this may be a trigger to start collection, and information from before an object W is determined as an NG product may be collected. For example, in FIG. 12, when the number of consecutive times in which an object W is determined as an NG product is a set value or larger, a condition for collecting all pieces of processing information acquired in the period from time (t3−ta), which is the timing of time ta before time t3 at which an object W is initially determined as an NG product, to time (t4+ta), which is the timing of time ta after time t4 at which an object W is not determined as an NG product, may be set.

A type of processing information to be stored may be selected as a collection condition. For example, some of pieces of processing information such as raw image data, processed image data, a calculated feature amount, and a measurement result indicating a state of an object W may be selected as objects to be collected. A predetermined number may be stored for each lot number. Also, image data may be processed and stored. For example, a portion of an image may be enlarged and stored.

[J. Others]

The feature amount calculating part 1111 may also perform a plurality of types of processing on raw image data. In a process of calculating a feature amount, when a plurality of pieces of processed image data are generated, the feature amount calculating part 1111 may store only some of the generated pieces of processed image data in the buffer area 120 or store all of the pieces of generated processed image data in the buffer area 120.

Although it has been described above that processing information is temporarily stored in the main memory 12, which is a volatile memory, processing information may also be temporarily stored in a nonvolatile memory.

<Advantages>

As described above, in the present embodiment, an image collection condition and an image collection rule may be set as storage conditions, and processing information may be stored according to the set storage conditions. Also, an image collection condition may be set separately from an image measurement condition that is referred to by the image processing device 10 to perform image measurement. Therefore, the user may set an image collection condition corresponding to a purpose of utilization of collected processing information. From this, the user may easily utilize stored processing information. Also, because only necessary processing information may be stored, the amount of data may be reduced.

In the present embodiment, the user may set a plurality of collection conditions and set a storage location for each of the collection conditions. From this, the user may set a storage location for each purpose of utilization of collected pieces of processing information. As a result, the user may easily utilize stored processing information.

In the present embodiment, the user may set a storage format of image data. From this, because a data size of image data may be reduced as necessary, the amount of data may be reduced.

In the present embodiment, a plurality of collection conditions may be set. Therefore, a collection condition may be set in detail, and as a result, reduction of the amount of data and utilization of data after storage are facilitated.

In the present embodiment, a portion of attribute information may be included in a storage name. From this, searching for required data after storage is facilitated, and thus utilization of data is facilitated. The user may select attribute information that he or she desires to set as a storage name among a plurality of pieces of attribute information. Therefore, a storage name may be formed only of necessary attribute information, and as a result, a storage name may be shortened.

In the present embodiment, because the analyzing part 1131 is included, the user may confirm whether required processing information may be collected according to a set collection condition. As illustrated in FIGS. 8, 9, and 12, because collected processing information may be visualized, the user may easily confirm a result of collection. Because an image collection condition may be set on the basis of a visualized result of collection, the image collection condition may be easily set.

In the present embodiment, as illustrated in FIG. 11, the analyzing part 1131 instructs the operation display device 30 to display a warning display on the display part 31 when a set image collection condition overlaps another image collection condition. From this, even when a plurality of storage conditions are set, processing information may be prevented from being redundantly stored. As a result, the amount of data may be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing system comprising:
one or a plurality of storage parts;
an imaging part configured to capture an image of an object and generate image data;
an image measuring part configured to calculate a feature amount included in the image data from the imaging part, evaluate the calculated feature amount according to an image measurement condition which is predetermined, and output an image measurement result related to the object;
a storage processing part configured to, determine whether to store the image data according to the feature amount calculated from the image data and one or a plurality of image collection conditions comprising a first collection condition and a second collection condition, when the feature amount calculated from the image data satisfies the image collection conditions set independently from the image measurement condition, store the image data and attribute information indicating the image measurement result corresponding to the image data in any one of the one or the plurality of storage parts according to an image collection rule associated with the satisfied image collection condition; and
a setting receiving part configured to receive setting of the image collection conditions and the image collection rule,
wherein the image collection rule comprises a storage format rule for the image data and a storage location rule for the image data,
wherein the storage processing part is configured to determine whether to store the image data according to the second collection condition set independently from the feature amount to collect a portion of the image data that satisfies the first collection condition after determining whether to store the image data according to the first collection condition set in relation to the feature amount, wherein the second collection condition is set to specify a collection frequency by which the portion of the image data that satisfies the first collection condition is stored,
wherein the first collection condition comprises whether the feature amount is greater than a threshold, and the second collection condition comprises the collection frequency set independently from the feature amount,
wherein the storage format rule comprises a rule as to whether the image data is stored in a compressed format,
wherein if the feature amount is greater than the threshold, the storage processing part determines not to store the image data; if the feature amount is not greater than the threshold, the storage processing part determines to store the image data in a first storage location and sets the image data is not stored in the compressed format; if the feature amount is not greater than the threshold and the second collection condition is not satisfied, the storage processing part determines not to store the image data in a second storage location; if the feature amount is not greater than the threshold and the second condition is satisfied, the storage processing part determines to store the image data in the second storage location and sets the image data is stored in the compressed format.

2. The image processing system according to claim 1, wherein the rule as to whether the image data is stored in the compressed format comprises a rule as to whether the image data is stored in a format that allows the image data to be restored to a state before compression when the image data is compressed.

3. The image processing system according to claim 1, wherein:
the attribute information comprises one or a plurality of pieces of information; and
when storing the image data and the attribute information, the storage processing part sets at least one of the pieces of information of the attribute information as a storage name.

4. The image processing system according to claim 3, wherein:
the image collection rule includes a rule of the storage name; and
the setting receiving part receives setting of the rule of the storage name.

5. The image processing system according to claim 1, further comprising an analyzing part configured to collect the image data that satisfies the image collection condition received by the setting receiving part and analyze a result of the collection on the basis of the collected image data and attribute information corresponding to the image data.

6. The image processing system according to claim 5, further comprising a display part configured to display the attribute information corresponding to the image data collected by the analyzing part.

7. The image processing system according to claim 6, wherein:
the one or the plurality of storage parts store the image collection conditions and the image collection rule;
the analyzing part searches for, among the image collection conditions received by the setting receiving part, an image collection condition overlapping with the image collection condition stored in the one or the plurality of storage parts except the image collection conditions received by the setting receiving part; and
the display part displays a result searched by the analyzing part.

8. An image processing device, comprising:
one or a plurality of storage parts;
an interface configured to receive image data of an object captured by an imaging device;
an image measuring part configured to calculate a feature amount included in the image data from the imaging device, evaluate the calculated feature amount according to an image measurement condition which is predetermined, and output an image measurement result related to the object;
a storage processing part configured to, determine whether to store the image data according to the feature amount calculated from the image data and one or a plurality of image collection conditions comprising a first collection condition and a second collection condition, when the feature amount calculated from the image data satisfies the image collection conditions set independently from the image measurement condition, store the image data and attribute information indicating the image measurement result corresponding to the image data in any one of the one or the plurality of storage parts according to an image collection rule associated with the satisfied image collection condition; and
a setting receiving part configured to receive setting of the image collection condition and the image collection rule,
wherein the image collection rule comprises a storage format rule for the image data and a storage location rule for the image data,
wherein the storage processing part is configured to determine whether to store the image data according to the second collection condition set independently from the feature amount to collect a portion of the image data that satisfies the first collection condition after determining whether to store the image data according to the first collection condition set in relation to the feature amount, wherein the second collection condition is set to specify a collection frequency by which the portion of the image data that satisfies the first collection condition is stored,
wherein the first collection condition comprises whether the feature amount is greater than a threshold, and the second collection condition comprises the collection frequency set independently from the feature amount,
wherein the storage format rule comprises a rule as to whether the image data is stored in a compressed format,
wherein if the feature amount is greater than the threshold, the storage processing part determines not to store the image data; if the feature amount is not greater than the threshold, the storage processing part determines to store the image data in a first storage location and sets the image data is not stored in the compressed format; if the feature amount is not greater than the threshold and the second collection condition is not satisfied, the storage processing part determines not to store the image data in a second storage location; if the feature amount is not greater than the threshold and the second condition is satisfied, the storage processing part determines to store the image data in the second storage location and sets the image data is stored in the compressed format.

9. A non-transitory computer-readable recording medium comprising an image processing program causing a computer to perform steps of:
receiving image data of an object captured by an imaging device;
calculating a feature amount included in the image data from the imaging device;
evaluating the calculated feature amount according to an image measurement condition which is predetermined and outputting an image measurement result on the object;
determining whether to store the image data according to the feature amount calculated from the image data and one or a plurality of image collection conditions comprising a first collection condition and a second collection condition, when the feature amount calculated from the image data satisfies the image collection conditions set independently from the image measurement condition, storing the image data and attribute information indicating the image measurement result corresponding to the image data in any one of the one or the plurality of storage parts according to an image collection rule associated with the satisfied image collection condition; and
receiving setting of the image collection condition,
wherein the image collection rule comprises a storage format rule for the image data and a storage location rule for the image data,
wherein the step of determining whether to store the image data according to the feature amount calculated from the image data and the image collection conditions comprises:
determining whether to store the image data according to the first collection condition and the second collection condition set independently from the feature amount to collect a portion of the image data that satisfies the first collection condition after determining whether to store the image data according to the first collection condition set in relation to the feature amount, wherein the second collection condition is set to specify a collection frequency by which the portion of the image data that satisfies the first collection condition is stored, wherein the first collection condition comprises whether the feature amount is greater than a threshold, and the second collection condition comprises the collection frequency set independently from the feature amount, wherein the storage format rule comprises a rule as to whether the image data is stored in a compressed format, wherein the step of determining whether to store the image data according to the feature amount calculated from the image data and the image collection conditions comprises:

if the feature amount is greater than the threshold, determining not to store the image data;

if the feature amount is not greater than the threshold, determining to store the image data in a first storage location and sets the image data is not stored in the compressed format;

if the feature amount is not greater than the threshold and the second collection condition is not satisfied, determining not to store the image data in a second storage location;

if the feature amount is not greater than the threshold and the second condition is satisfied, determining to store the image data in the second storage location and sets the image data is stored in the compressed format.

10. The image processing system according to claim 2, wherein:

the attribute information comprises one or a plurality of pieces of information; and when storing the image data and the attribute information, the storage processing part sets at least one of the pieces of information of the attribute information as a storage name.

11. The image processing system according to claim 2, further comprising an analyzing part configured to collect the image data that satisfies the image collection condition received by the setting receiving part and analyze a result of the collection on the basis of the collected image data and attribute information corresponding to the image data.

12. The image processing system according to claim 3, further comprising an analyzing part configured to collect the image data that satisfies the image collection condition received by the setting receiving part and analyze a result of the collection on the basis of the collected image data and attribute information corresponding to the image data.

13. The image processing system according to claim 4, further comprising an analyzing part configured to collect the image data that satisfies the image collection condition received by the setting receiving part and analyze a result of the collection on the basis of the collected image data and attribute information corresponding to the image data.

* * * * *